Patented Dec. 13, 1938

2,140,400

UNITED STATES PATENT OFFICE 2,140,400

MANUFACTURE OF CATALYSTS

Seymour Faulkner, Cincinnati, Ohio, assignor to The Procter & Gamble Company, Cincinnati, Ohio, a corporation of Ohio No Drawing. Continuation of application Serial No. 648,321, December 21, 1932. This application September 27, 1933, Serial No. 691,244

13 Claims. (Cl. 23—236)

My invention relates to improvements in processes for the manufacture of metallic catalysts, especially such as are used for the hydrogenation of oils. My primary object is to produce catalysts of uniformly high activity, at low cost. Another object is to avoid or reduce the darkening in color and the development of free fatty acids in the oil used as vehicle for the reduction of the catalyst. This application is a continuation of my application Serial No. 648,321, filed December 21, 1932.

My discoveries relate to the so-called wet reduction of catalytic metals wherein the metallic substance is reduced by hydrogen while suspended in a suitable fluid such as oil. I will describe my invention with reference to wet reduction of nickel carbonate, but it will be understood that this metal and its compound are selected because of the relative cheapness of the raw materials and the excellence of finely divided nickel as a catalyst, and not as limiting my invention thereto. Heretofore the wet reduction of nickel carbonate has produced variable results, the suspending oil has been darkened and decomposed due to prolonged use of high temperatures and a catalyst of but small activity often resulted.

I have discovered certain conditions under which I can reduce carbonate of nickel, or other catalytic metals, at lower temperatures than have hitherto been possible, and obtain invariably products of the highest catalytic activity.

The two conditions that I have found which cause a great increase in catalytic activity are (1) the boiling of the precipitated carbonate for a considerable period of time in alkaline solution, during which it undergoes certain definite chemical and physical changes which result in the production of a more active catalyst, and (2) the presence of small amounts of alkaline material in the metallic carbonate during the reduction stage which greatly promotes or accelerates the reduction.

When a soluble nickel compound is precipitated under ordinary conditions by a normal alkali carbonate such as $Na_2CO_3$ the precipitate that forms from it is usually called nickel carbonate, but instead of being the normal nickel carbonate, is a hydrated basic carbonate of nickel of variable composition, but always containing considerably less $CO_2$ than the normal carbonate. The remainder of the $CO_2$ from the $Na_2CO_3$ which is not contained in the basic carbonate precipitate is partly evolved as a gas and partly remains dissolved in the solution, but this last portion readily passes off when the solution is merely brought to a boil. My invention does not concern itself with this carbon dioxide, but deals with the proportion of $CO_2$ in the precipitate, i. e., the combined carbon dioxide content thereof.

The precipitated basic nickel carbonate as ordinarily produced under commercial conditions contains from 16 to 22% of combined carbon dioxide based on the nickel content and the result of my process is to reduce this, which I accomplish by prolonged boiling. The maintenance of slightly alkaline conditions during the boiling promotes the change in the precipitate that I obtain in this step.

I find that as the combined $CO_2$ is reduced in the nickel (or other metallic) carbonate, the catalytic activity of the final product is progressively enhanced. Any amount of reduction of combined $CO_2$ below 15% of the metal present gives enhanced results; but reduction below 5% does not seem to give a noticeable further increase in the resulting activity.

I do not find that less than 12 minutes of boiling will serve to bring about any useful result and over 30 minutes boiling does not seem necessary ordinarily when the solutions are reasonably free from other salts, but in case of impure solutions, especially those containing considerable amounts of sodium sulfate, a considerably longer time of boiling is sometimes necessary. Good results, however, are always obtained when the per cent of combined $CO_2$ in the so-called nickel carbonate is between 5% and 12% of the nickel content.

As evidence of the desired change taking place, attention is called to the nature of the precipitate before and after proper treatment. The nickel carbonate as precipitated is a somewhat gelatinous substance and light green in color. After prolonged boiling, such as will satisfy my requirements, in the presence of a small amount of sodium carbonate or other alkali, the precipitate swells, becomes more gelatinous, and assumes a dark green color. The bulk of the filter cake resulting after filtering the boiled precipitate, will be as much as twice that of the filtered precipitate before boiling.

This difference in thickness of filter cake or the difference in volume of filtered precipitate per gram of nickel in the boiled precipitate as compared with that which has not been boiled is readily seen from the following experiment:

First prepare two identical solutions, each consisting of 200 c. c. of water containing three grams of nickel in the form of sulfate. Heat to boiling and add to each a boiling hot 20% solution of sodium carbonate in water sufficient in amount to allow 5% excess over that required for complete precipitation. In the case of pure nickel sulfate, this will require 28.5 c. c of solution containing 5.7 grams of sodium carbonate. One of these solutions should be filtered as soon as precipitated and without continued boiling, while the second should be boiled for twenty minutes. In each case filter on a small Buchner funnel with suction and continue the suction for one minute after the filtrate ceases to run. Then carefully remove the cake from the funnel and measure its thickness, and from this calculate the total volume of precipitate in cubic centimeters which, divided by the three grams of nickel in the original solution, will give the ratio of volume of precipitate per gram of nickel. It will be found that the boiled precipitate is dark green in color while the other is light green and the volume ratio of the boiled precipitate is much greater, usually twice as great. I find that when the precipitate has not been boiled the volume ratio to nickel obtained as above described ranges from about 5 to 8, while boiling according to the prescribed procedure usually results in a ratio of about 12.5 to 17. The increased volume ratio, however, is progressive, depending on the time of boiling up to the maximum obtainable, but I do not wish to limit myself to the figures just stated as a preferred range, since any improvement in volume ratio above 9 should be considered as a result of the practice of my invention.

With regard to the second point, the action of small amounts of alkali in accelerating the reduction of nickel carbonate and carbonates of other catalytic metals, I have found that while these carbonates cannot be successfully and consistently reduced by hydrogen to a state of efficient catalysts when pure, the result in all cases is greatly enhanced by the admixture of small but definitely controlled amounts of alkali carbonates, hydroxides, or oxides; and the reduction then takes place at notably lower temperature, and with less decomposition of the oil in which they are reduced. These alkaline materials thus incorporated appear to act as promoters or accelerators for the reduction in the wet state, and this effect could not have been foreseen or predicted from data hitherto known.

The amount of alkali needed is very small. I find that in reducing nickel carbonate, amounts of sodium carbonate as small as 0.1 per cent of the nickel present show a marked effect in facilitating the reduction, and larger amounts are increasingly effective up to about 2.0 per cent. Larger amounts than about 2.0 per cent, however, fail to show further improvement, and are objectionable because of the possible formation of soaps when reducing in oil. I obtain uniformly satisfactory results with amounts of sodium carbonate varying from about 1.0 per cent to 1.5 per cent of nickel, but I am not limited to these values.

I am aware that others have proposed the addition of alkali carbonates or hydroxides to metallic catalysts in the operation of hydrogenating oils, but not in the operation of reducing metal compounds to make catalysts. After reduction to the catalytic form, the alkali may be washed out of my catalysts, if desired, without noticeably reducing their efficiency when subsequently used in the hydrogenation of oils, or for other purposes. This discovery is of independent value as respects my complete procedure.

Heretofore, in attempting by the previously proposed procedure to prepare a catalyst by the wet reduction of a carbonate, such as nickel carbonate for example, the carbonate was ordinarily prepared by precipitating a solution of nickel sulphate or other nickel compound with sodium carbonate which was brought to a boil at the finish. The precipitate was then washed to remove the sodium sulphate formed in the reaction, and any other soluble salts. The precipitate was then dried, ground, suspended in oil, and subjected to a reducing operation by heating and by passing a rapid stream of hydrogen through the mixture. Mechanical agitation might also be used. A temperature of 240° C. or higher was usually necessary, although the fatty oils commonly used would darken badly and decompose to a serious extent at such temperatures. Under these conditions, if the nickel carbonate is substantially free from soluble alkaline salts, as would usually be the case, I have found it impractical to reduce the nickel to the metallic state and in such form that the catalyst exhibits any appreciable activity, even with long continued treatment.

In carrying out my improved procedure, using nickel carbonate for example, I first prepare the nickel carbonate by precipitating a solution of nickel sulphate or other salt with an excess of sodium carbonate at boiling temperature, and then continue boiling the precipitate in the alkaline solution for a sufficient period to convert it to a very gelatinous mass, as previously described. This procedure, I have found, puts the precipitate into a condition which results in a more active catalyst, when subsequently reduced under proper conditions, than can otherwise be obtained. I then separate the precipitate from the liquor in a filter press or other suitable apparatus. The alkali which I add to promote or accelerate the reduction may be added in various ways. For example, a sufficient excess of sodium carbonate may be used in precipitating the nickel, and the washing of the precipitate may then be so regulated as to leave the desired amount of alkali in the washed nickel precipitate. The small quantity of sodium sulphate remaining in the precipitate with the carbonate is harmless. A second way comprises initially washing the precipitate thoroughly so as to remove substantially all of the soluble salts, both sulphate and carbonate, and then following this by a washing with a solution of the alkali of such concentration, to be experimentally determined for any given set of operating conditions, as will introduce the desired percentage of alkali into the washed nickel precipitate. A third way is to wash the precipitate until substantially free from soluble salts, dry the precipitate, and then mix in the desired amount of alkali, such as sodium carbonate, in dry form. I do not limit myself to any particular means of introducing the desired amount of alkali. The preferred amount is about 0.5 per cent to 1.5 per cent of sodium carbonate, or equivalent alkali, based on the actual content of nickel or other catalytic metal.

Various forms of alkali have been found effective as promoters or accelerators in this reaction including, but without limitation, the carbonates, hydroxides or oxides of sodium, potassium, and calcium. These are also effective in promoting the reduction of other catalytic metals than nickel, such as cobalt, copper and iron.

The nickel carbonate with admixed alkali is then dried at a suitable temperature, (preferably at as low a temperature as is practicable) if not already dried before mixing, and is then introduced into a suitable quantity of oil or other suitable liquid medium. The mixture need be heated only to about 210°–230° C. while a current of hydrogen is passed therethrough, with or without mechanical agitation. Reduction to a catalyst of uniformly high activity occurs rapidly with but relatively slight darkening or decomposition of the oil.

The following examples will illustrate this invention:

*Example 1.*—Twenty thousand pounds of a solution of nickel sulphate containing 2.0 per cent of metallic nickel was heated to boiling, and to it was added, with continued boiling, 4,000 pounds of a 20.0 per cent solution of sodium carbonate which had previously been heated to approximately the boiling point. This amount of sodium carbonate is about 7.5 per cent more than the amount calculated to react with the nickel sulphate. The boiling was continued for thirty minutes, after which it was found that the precipitate had assumed the desired bulky and gelatinous condition. It was then filtered and washed with water while still in the filter press until substantially free from soluble sulphates and carbonates. It was then finally washed while still in the filter press with a solution containing 0.3 per cent of sodium carbonate. The material was then dried at about 125° C. Under these conditions, it was found that the dried material would contain an amount of sodium carbonate equal to about 1.0 per cent to 1.5 per cent of the nickel. This dried precipitate was then ground and mixed with refined cocoanut oil in such proportions that the mixture contained 5.0 per cent of nickel. This was heated to 210–230° C. with agitation, and a rapid stream of hydrogen was passed through it for a period of eight hours. Reduction began immediately, and at the end of the operation the precipitate was found to have been reduced to a catalyst having activity of the highest order.

*Example 2.*—Twenty thousand pounds of a solution of nickel sulphate containing 2.0 per cent nickel was heated to boiling and precipitated as in Example No. 1, with 4,000 pounds of a boiling solution containing 20.0 per cent sodium carbonate as before. The solution was boiled as before until the precipitate assumed the desired gelatinous form, after which it was filtered in a filter press and washed with water until substantially free from soluble sulphates and carbonates. Up to this point the procedure was the same as in Example No. 1. It was then dried as before at about 125° C. After drying, an amount of dry sodium carbonate equal to about 1.0 to 1.5 per cent of the nickel was intimately mixed with the dried nickel carbonate by grinding the mixture together in a ball mill. The dried mixture was then suspended in refined cocoanut oil and reduced in the same way as described in Example No. 1, for a period of eight hours. Reduction began immediately. Samples were taken during the reduction and tested at the end of two hours, four hours, six hours, and at the end of the operation after eight hours. These tests showed that the maximum catalytic activity was attained after about four hours' reduction under the conditions as described, and that the activity was of the highest order, as in Example No. 1.

*Check Test No. 3.*—A portion of the same dried nickel carbonate prepared in Experiment 2, but without the addition of sodium carbonate, was suspended in refined cocoanut oil and subjected to the action of heat and hydrogen in exactly the same manner as above described, but in this case the rate of reduction was much slower and at the end of the eight hours' reduction the material was found to be practically inactive catalytically.

*Example 4.*—Twenty thousand pounds of a solution of nickel sulphate containing 2.0 per cent metallic nickel was heated to boiling, and to it was added, with continued boiling, 400 pounds of 20.0 per cent solution of sodium carbonate which had previously been heated to approximately the boiling point. This amount of sodium carbonate is about 7.5 per cent more than the amount calculated to react with the nickel sulphate. The boiling was continued for thirty minutes, after which it was found that the precipitate had assumed the desired bulky and gelatinous condition. It was then filtered and washed with water while still in the filter press until substantially free from soluble sulphates and carbonates. Up to this point the procedure was the same as in Example No. 1. It was then finally washed while still in the filter press with a solution containing 0.15 per cent of caustic soda. The material was then dried at about 125° C. Under these conditions, it was found that the dried material contained about 0.5 to 1.0 per cent of NaOH based on the nickel content. This dried precipitate was then ground and mixed with refined cocoanut oil in such proportions that the mixture contained 5.0 per cent of nickel. This was heated to 210–230° C. with agitation, and a rapid stream of hydrogen was passed through for a period of eight hours. Reduction began immediately, and at the end of the operation the precipitate was found to have been reduced to a catalyst having activity of the highest order.

*Example 5.*—Twenty thousand pounds of a solution of nickel sulphate containing 2.0 per cent nickel was heated to boiling and precipitated as in Example No. 1, with 4,000 pounds of a boiling solution containing 20.0 per cent sodium carbonate as before. The solution was boiled for thirty minutes as before when the precipitate had assumed the desired gelatinous form, after which it was filtered in a filter press and washed with water until substantially free from soluble sulphates and carbonates. Up to this point the procedure was the same as in Example No. 1. After drying at 125° C. as before, an amount of calcium carbonate equal to about 5.0 per cent of the nickel was intimately mixed with the dried nickel carbonate by grinding the mixture together in a ball mill. The dried mixture was then suspended in refined cocoanut oil and reduced in the same way as described in Example No. 1, for a period of eight hours. Reduction began immediately, and at the end of the operation the precipitate was found to have been reduced to a catalyst of fairly high activity.

A large number of runs in actual plant practice show that when the procedure described in this specification is followed nickel carbonate is invariably reduced to a highly active catalyst, which will permit the hydrogenation of oils at considerably lower temperatures than those hitherto used, while without the prescribed conversion to the bulky and extremely gelatinous form as described by long boiling, and the addition of alkali as a promoter or accelerator for the reduction, the product usually has very little catalytic activity.

Having thus described my invention, what I claim as new and desire to secure by Letters Patent, is:—

1. That method of preparing a catalyst by wet reduction which includes the steps of chemically precipitating a carbonate of a hydrogenating metal of the class consisting of nickel, iron, cobalt and copper in aqueous solution, and then reducing the amount of combined $CO_2$ in the carbonate to an amount less than fifteen percent of the metal content by prolonged boiling under alkaline conditions until the volume of a sample of the precipitate when filtered with suction on a Buchner funnel as described, amounts to more than nine cubic centimeters per gram of metal content, said boiling being continued for at least twelve minutes, afterward reducing the precipitated carbonate to a catalytic metal by a wet reduction step.

2. That method of preparing a catalyst by wet reduction which includes the steps of chemically precipitating a carbonate of nickel in aqueous solution, and then reducing the amount of combined $CO_2$ in the carbonate to an amount less than fifteen per cent of the nickel content by prolonged boiling under alkaline conditions until the volume of a sample of the precipitate when filtered with suction on a Buchner funnel as described, amounts to more than nine cubic centimeters per gram of nickel content, said boiling being continued for at least twelve minutes, afterward reducing the precipitated carbonate to a catalytic metal by a wet reduction step.

3. That method of preparing a catalyst by wet reduction which includes the steps of chemically precipitating a carbonate of a hydrogenating metal of the class consisting of nickel, iron, cobalt and copper in aqueous solution, and then reducing the amount of combined $CO_2$ in the precipitated carbonate to an amount less than fifteen per cent of the metal content by prolonged boiling under alkaline conditions until the volume of a sample of the precipitate when filtered with suction on a Buchner funnel as described, amounts to more than nine cubic centimeters per gram of metal content, afterward reducing the precipitated carbonate to a catalytic metal by a wet reduction step.

4. That method of preparing a catalyst by wet reduction which includes the steps of chemically precipitating a carbonate of nickel in aqueous solution, and then reducing the amount of combined $CO_2$ in the precipitated carbonate to an amount less than fifteen percent of the nickel content by prolonged boiling under alkaline conditions until the volume of a sample of the precipitate when filtered with suction on a Buchner funnel as described, amounts to more than nine cubic centimeters per gram of nickel content, afterward reducing the precipitated carbonate to a catalytic metal by a wet reduction step.

5. The improvement in the process of preparing catalysts suitable for hydrogenation of oils, comprising boiling a carbonate of a hydrogenating metal of the class consisting of nickel, iron, cobalt and copper in the presence of an alkaline solution until the combined carbon dioxide is reduced to an amount less than 15 per cent of the metal content, and the volume of a sample of the precipitate, when filtered with suction on a Buchner funnel as described, amounts to more than 9 c. c. per gram of metal content, separating and drying said metallic carbonate, and subsequently suspending said metallic carbonate in oil and subjecting it to reducing conditions with hydrogen in the presence of an amount of carbonate, hydroxide, or oxide, of an alkali, or alkaline earth metal, equivalent to from 0.1 per cent to 2.0 per cent of sodium carbonate based on the metal content of the said metallic carbonate.

6. The improvement in the process of preparing catalysts suitable for hydrogenation of oils, comprising boiling nickel carbonate in the presence of an alkaline solution until the combined carbon dioxide is reduced to an amount less than 15 per cent of the nickel content, and the volume of a sample of the precipitate, when filtered with suction on a Buchner funnel as described, amounts to more than 9 c. c. per gram of nickel content, separating and drying said nickel carbonate, and subsequently suspending said nickel carbonate in oil or other liquid medium and subjecting it to reducing conditions in the presence of an amount of carbonate, hydroxide, or oxide, of an alkali, or alkaline earth metal, equivalent to from 0.1 per cent to 2.0 per cent of sodium carbonate based on the nickel content of the said nickel carbonate.

7. The step in the process of preparing catalysts suitable for hydrogenation of oils by the wet reduction of nickel carbonate, consisting in boiling the nickel carbonate in the presence of an alkaline solution until the combined carbon dioxide is reduced to an amount less than 15 per cent of the nickel content and the volume of a sample of the precipitate, when filtered with suction on a Buchner funnel as described, amounts to more than 9 c. c. per gram of nickel content, before subjecting said nickel carbonate to wet reduction.

8. The step in the process of preparing catalysts having enhanced catalytic power in the hydrogenation of oils by the wet reduction of nickel carbonate consisting in suspending in oil the nickel carbonate with which is incorporated an amount of carbonate, hydroxide, or oxide, of an alkaline or alkaline earth metal equivalent to from 0.1 per cent to 2.0 per cent of sodium carbonate based on the nickel content of the said nickel carbonate in order to improve the catalytic power of the resulting metal, and subjecting it to reducing conditions with hydrogen.

9. The step in the process of preparing catalysts having enhanced catalytic power in the hydrogenation of oils by the wet reduction of nickel carbonate consisting in suspending in oil the nickel carbonate with which is incorporated an amount of sodium carbonate equal to from 0.1 per cent to 2.0 per cent of the nickel content of the said nickel carbonate in order to improve the catalytic power of the resulting metal, and subjecting it to reducing conditions with hydrogen.

10. The improvement in the process of preparing catalysts suitable for hydrogenation of oils, comprising boiling the carbonate of a hydrogenating metal of the class consisting of nickel, iron, cobalt and copper in the presence of an alkaline solution until the combined carbon dioxide is reduced to an amount less than 15 per cent of the metal content and the volume of the filtered precipitate, when a sample is filtered with suction on a Buchner funnel as described, amounts to more than 9 c. c. per gram of metal content, separating and drying said metallic carbonate, and subsequently suspending said metallic carbonate in oil and subjecting it to reducing conditions at a temperature of approximately 210° to 230° C. with hydrogen.

11. The improvement in the process of prepasing catalysts suitable for hydrogenation of oils, comprising boiling nickel carbonate in the presence of an alkaline solution until the combined carbon dioxide is reduced to an amount less than 15 per cent of the nickel content, and the volume of the filtered precipitate, when a sample is filtered with suction on a Buchner funnel as described, amounts to more than 9 c. c. per gram of nickel content, separating and drying said nickel carbonate, and subsequently suspending said nickel carbonate in oil or other liquid medium and subjecting it to reducing conditions at a temperature of approximately 210° to 230° C. with hydrogen.

12. A method of producing a catalyst which consists in reducing by hydrogen in oil, a compound consisting essentially of a nickel carbonate having an amount of carbonate, hydroxide, or oxide, of an alkali or alkaline earth metal equivalent to from 0.1 per cent to 2.0 per cent of sodium carbonate based on the nickel content of the said nickel carbonate, said nickel carbonate having had its combined carbon dioxide reduced to 15 per cent or less in proportion to the nickel by boiling in the presence of an alkaline solution.

13. That method of preparing by wet reduction a catalyst having enhanced catalytic power in the hydrogenation of oils which includes the step of suspending in oil for reduction by hydrogen a carbonate of a hydrogenating metal of the class consisting of nickel, iron, cobalt and copper to which has been added an amount of carbonate, hydroxide, or oxide, of an alkali or alkaline earth metal equivalent to from 0.1 per cent to 2.0 per cent of sodium carbonate based on the metal content of the said metal carbonate.

SEYMOUR FAULKNER.